July 18, 1961  H. M. NORMAN  2,993,133
METADYNE MOTOR ARRANGEMENT
Filed Jan. 19, 1959

INVENTOR.
Horace M. Norman
BY
Byron, Hume, Groen & Clement
Attys.

United States Patent Office 2,993,133
Patented July 18, 1961

2,993,133
METADYNE MOTOR ARRANGEMENT
Horace M. Norman, Milwaukee, Wis., assignor to The Louis Allis Co., Milwaukee, Wis., a corporation of Wisconsin
Filed Jan. 19, 1959, Ser. No. 787,404
13 Claims. (Cl. 310—139)

This invention relates to drive systems for constant tension winders and particularly to metadyne motors for use in such drives.

The conventional metadyne motor is an armature reaction type machine wherein the armature includes a first pair of power input brushes, a second pair of brushes arranged in quadrature relative to the first pair of brushes and short circuited for generating a main armature flux, and a field winding for controlling the power input to the motor at the first pair of brushes. The field winding is supplied from a constant voltage-variable current source and the first pair of armature brushes is also supplied from a constant voltage-variable current source. By selecting a proper current flow through the field winding, the current flow through the first pair of armature brushes, that is, the armature line current will be regulated accordingly so that the watts input to the motor at the first pair of armature brushes is maintained substantially constant which results in an almost constant horsepower output for the motor. For this arrangement, the speed-torque curve approximates a hyperbola. Thus at low speeds the torque output is high and at high speeds the torque output is low.

However, for most winding operations, it is desirable that the speed-torque characteristic be modified at low speeds from the hyperbola form so that there is a falling off of torque as the speed of the motor decreases.

It is an object of the present invention to provide a new and improved metadyne motor wherein at higher motor speeds, the horsepower output is maintained substantially constant in accordance with the current flow through the field winding but at lower speeds, the horsepower output diminishes.

A further object of the invention is to provide a new and improved metadyne motor including a further field winding connected in series with the shorted pair of armature brushes so that the ampere-turns of the additional field winding is in accordance with the speed of the motor.

The invention, both as to its arrangement and method of operation, and further objects thereof, will be understood from the following description and drawings, forming a part thereof wherein.

Figure 1:
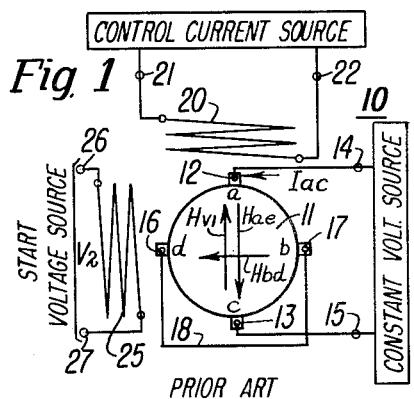
FIGURE 1 is a schematic representation of a metadyne motor as known and understood in the art.

Referring now to the drawings, there is shown in FIGURE 1 a schematic representation of a simple metadyne motor 10. This arrangement includes an armature 11, a main control field winding 20 and a start field winding 25. The armature 11 is provided with a first set of oppositely disposed brushes 12 and 13 connected across a constant voltage source at terminals 14 and 15, and a second set of oppositely disposed brushes 16 and 17 connected in short circuit by a conductor 18. The latter set of brushes are arranged in quadrature with regards to the first set. For purposes of better facilitating explanation of current flows and magnetic field patterns in the motor, the armature brushes are given alphabetical sub-reference characters so that the brush 12 is identified by the sub-reference character $a$, the brush 17 is identified by the sub-reference character $b$, the brush 13 is identified by the sub-reference character $c$, and the brush 16 is identified by the sub-reference character $d$.

Assuming that the arrangement of FIGURE 1 is connected as shown with a constant voltage source connected across the terminals 14 and 15 and with a control current source connected to the terminals 21 and 22 of the main control winding 20, a magnetic field $H_{v1}$ having a direction as indicated by the arrow will be generated by the current flow through the field winding 20 and an opposing field $H_{ac}$ will be supplied by the line current flow to the brushes $a$ and $c$. The armature of the motor will not rotate inasmuch as there is no horizontal field in the direction $b$ and $d$ with which to develop a starting torque. Accordingly, a start voltage is connected across the terminals 26 and 27 of the start field winding 25 to supply a horizontal field in the direction from $b$ to $d$. Accordingly, a starting torque is developed at the armature and rotation thereof commences.

In the arrangement of FIGURE 1, it is necessary that there be maintained a slight difference in the flux $H_{v1}$ and $H_{ac}$ or between the flux producing power of the winding 20 and that of the armature brushes 12 and 13 so as to create a small voltage between the brushes 16 and 17. This voltage difference between the brushes 16 and 17 causes a short circuit current through the conductor 18 which in turn creates the main flux in the horizontal direction for producing the motor torque. Accordingly, after the motor begins to rotate through efforts of the start field winding 25, an armature-reaction field is developed between the brushes 16 and 17 thereby removing the necessity for energizing the start voltage winding 25.

Figure 5:
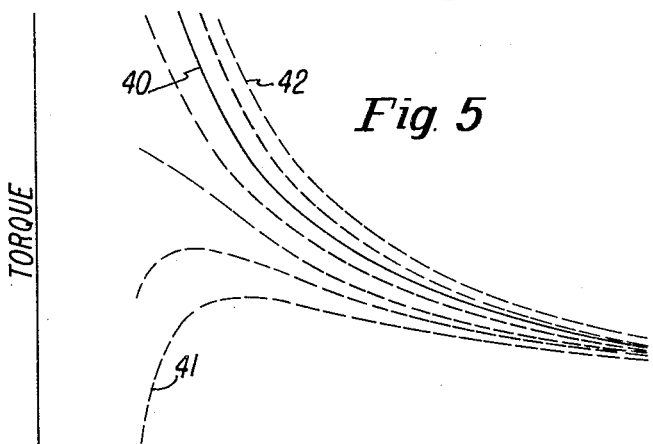
FIGURE 5 is a chart illustrating the speed-torque characteristic of metadyne motors as known in the prior art and as modified and improved in accordance with the principles of the present invention.

The function of the main control field winding 20 is to produce a magnetic field in the armature 11 for controlling the amount of current through the armature brushes 12 and 13 from the source connected to the terminals 14 and 15. The field and armature relationship is such that the armature line current is substantially proportional to the field winding current. Thus, when the current through the winding 20 is regulated to a value that results in the motor delivering the desired power, the power output of the motor will remain substantially constant throughout the workable speed range of the motor. Accordingly, the watts input from the line is substantially constant for a given setting of the current through the winding 20 of the metadyne motor 10. This results in an almost constant horsepower output and the speed-torque curve approximates a hyperbola as illustrated in FIGURE 5 by the full line curve 40. It is clear from this illustration that at low speeds, the torque of the motor is high and that at high speeds, the torque of the motor is low. However, for most motor applications, it is desirable that the speed-torque characteristic be modified from the hyperbola, which represents a constant power condition, to a falling off of power as the motor approaches the lower speeds. A metadyne motor arrangement, whereby the last named characteristic can be achieved is illustrated in FIGURE 2.

Figure 2:
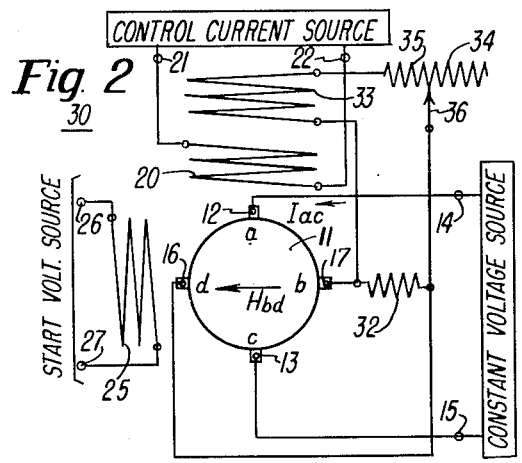
FIGURE 2 is a schematic representation of a modified and improved metadyne motor in accordance with the present invention.

Referring specifically to FIGURE 2, there is shown therein an improved metadyne motor arrangement which automatically varies its own power output with variations in motor speed. The armature 11, the field winding 20 and the start winding 25, arrangements illustrated therein, all correspond to the similarly numbered components shown in FIGURE 1. Specifically, the armature 11 is provided with a first set of armature brushes 12 and 13 and a second set of armature brushes 16 and 17, the former of which are energized by the constant voltage source applied to the terminals 14 and 15 associated therewith. The control field winding 20 is supplied with a control current at the terminals 21 and 22 thereof and the start winding 25 has a start voltage source connected to the terminals 26 and 27 thereof. Further, an impedance, here illustrated as a resistor 32, is connected in series with the armature brushes 16 and 17. In parallel with the resistor 32 is connected an auxiliary control winding 33 and a variable resistor or rheostat 34 including a resistance element 35 and a variable tap 36. The auxiliary control winding 33 completes a circuit in parallel with the resistor 32 through the resistance element 35 and the variable tap 36, and the winding is arranged in the motor so as to provide a magnetic field in a direction of that provided by the main control winding 20. It is because of the influence of the auxiliary control winding 33 that the desired modification in the change of input power as the motor approaches the lower speeds is achieved.

With the addition of the auxiliary control winding 33, it is no longer true that the input motor current or armature line current is proportional to the current in the control winding 20. The new condition is that the armature line current through the brushes 12 and 13 is proportional to the sum of the ampere-turns of the main control winding 20 and of the auxiliary control winding 33. These ampere-turns are constant for the main control winding 20 but vary for the auxiliary control winding 33 in accordance with the speed of the motor.

Specifically, when the speed of the motor is high, the main field $H_{bd}$ is low and the current through the brushes $b$ and $d$, and accordingly, the current through the auxiliary control winding 33 is low. Under these conditions, the ampere-turns of the auxiliary control winding 33 are small as compared to the ampere turns of the control winding 20, so that the line current $I_{ac}$ in the armature is substantially unaffected. However, when the speed of the motor is low, the main field $H_{bd}$ is high and accordingly, the currents through the brushes 16 and 17 and the auxiliary control winding 33 is high so that the ampere-turns of the auxiliary control winding 33 is appreciable compared to the ampere-turns of the main control winding 20. Accordingly, the line current $I_{ac}$ is modified to a considerable extent. In one application the auxiliary control winding 33 might be arranged relative to the main control winding 20 so that at low speeds the ampere-turns thereof might become equal and opposite to the ampere-turns of the control winding 20 and cause the line current to approach zero so that the main field $H_{bd}$ would collapse and the torque would fall to zero. This condition is illustrated by the dashed curve 41 in FIGURE 5.

In another application, the auxiliary control winding 33 might be arranged in the motor so that at low speeds, the ampere turns of the power control winding may cooperate with the ampere-turns of the main control winding 20, thereby to increase the armature line current $I_{ac}$ and cause an increase in the torque of the motor. This condition may be illustrated for example by the broken line 42 in FIGURE 5.

Referring more specifically to the arrangement of FIGURE 2, starting of the motor is accomplished by applying a start voltage source across the terminals 26 and 27 of the start winding 25, applying a constant voltage source across the armature line terminals 14 and 15 and applying a control current source across the terminals 21 and 22 of the main control winding 20. The amount of input power to the motor is controlled by the amount of current applied through the main control winding 20, which, as previously described, controls the line current $I_{ac}$, and the modification in motor torque with motor speed may be provided by adjusting the movable arm 36 of the rheostat 34. Assuming that the auxiliary control winding 33 is connected so as to produce ampere-turns in opposition to the ampere-turns produced by the main control winding 20, the motor will exhibit the desired decreasing power characteristic with decreasing speed without any further control adjustments being necessary.

Figure 4:
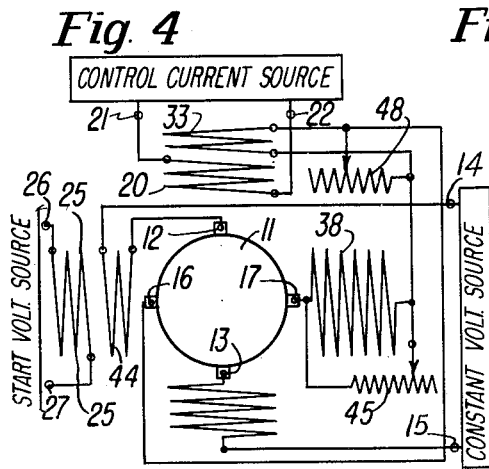
FIGURES 3 and 4 illustrate alternative arrangements for the improved and modified metadyne motor in accordance with the invention.

For the idealized condition, where the saturation effect of the main field is neglected and the resistance of the armature brsuhes and field windings are neglected, it can be shown that the armature line current between the brushes $a$ and $c$ is:

$$I_{ac} = A \pm \frac{B}{n} \qquad (1)$$

where A and B are constants and $n$ is motor speed. The stated relationship is plus ($+$) and is minus ($-$), respectively, when the auxiliary winding 33 is connected in aiding relation with the main control winding 20 and when the auxiliary winding 33 is connected in opposing relation with the main control winding 20. In this arrangement, the torque T may be expressed as follows:

$$T \approx \frac{I_{ac}}{n} \qquad (2)$$

from Equation 1, the relationship for torque can be written as follows:

$$T = \frac{A'}{n} \pm \frac{B'}{n^2} \qquad (3)$$

where $A'$ and $B'$ are constants different from the constants A and B. The curves of FIGURE 4 are plotted from this equation for various values of $A'$ and $B'$, the solid line curve 40 being the plot for the condition where $B'$ is zero, that is, roughly for the structure of FIGURE 1. The values of the constants $A'$ and $B'$ are determined in accordance with the value of the current flow through the control winding 20, the actual resistance value of the rheostat 34, the magnetomotive force of the main winding 20 and the value of the resistor 32. It is obvious that this general nature of the curves will be uninfluenced by whether the start winding 25 is maintained energized throughout the operational period.

Figure 3:
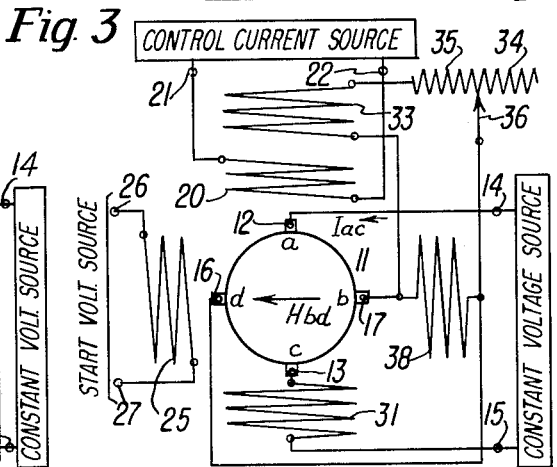

In FIGURE 3, there is illustrated a variation of the metadyne motor in accordance with the invention. The components of the motor illustrated in FIGURE 3 are substantially the same as shown in FIGURE 2 except that the resistor 32 of FIGURE 2 is replaced in the arrangement of FIGURE 3 by a field winding 38 and a compensation winding 31 is connected in series with the brush 13. The torque-speed characteristic of the motor shown in FIGURE 3 will conform to the pattern illustrated in FIGURE 5 except that the nature of the constants $A'$ and $B'$ will vary in accordance with the change in the motor circuitry to include the compensation winding 31 and to replace the resistor 32 by the winding 38.

A further variation of the arrangement in accordance with the invention is illustrated in FIGURE 4. In this scheme, the winding 33, which causes the desired deviation in torque, is connected in series with the brushes 16 and 17 of the armature and the winding 38. There are two rheostats shown connected in shunt, one 45 across winding 38, and the other 48 across winding 33. These can be used to control the effect of windings 33 and 38 upon the torque-speed curve. A series winding 44 is shown which is inserted between brush 12 and terminal 14. This can be used for starting purposes either with or in lieu of winding 25.

In the arrangement shown in FIGURE 4, the rheostat 45 controls the proportionate amount of current flow through the field winding 38 for influencing the amount of motor torque and the rheostat 48 controls the proportionate amount of current flow through the auxiliary winding 33 for influencing the shape of the speed-torque characteristic. Adjustment of both of these rheostats can effect a complete departure in the curve from the hyperbolic form. Though both rheostats are shown, either one may be eliminated from the circuit.

In accordance with the above description, there has been provided herewith, a new and improved direct current motor of the metadyne type wherein the current flow through the set of shunted brushes is utilized in part for purposes of providing an auxiliary control to the main magnetomotive force field operating on the main set of brushes. The control provided by the auxiliary field winding is such that the power output of the motor is particularly affected at low motor speeds and is only slightly affected at high motor speeds. Accordingly, by utilizing the auxiliary control winding in opposition to the main control winding, the torque characteristic of the motor can be made to fall off at low motor speeds thereby modifying the torque-speed characteristic thereof from the conventional hyperbolic form.

While the arrangements of the invention described herein are at present considered to be preferred, it is understood that variations and modifications may be made therein and it is intended to cover in the appended claims all such variations and modifications as fall within the true spirit and scope of the invention.

What is claimed is:

1. A direct current motor comprising a field member and an armature member, a first field winding on said field member, a second field winding on said field member, said first and second field windings being arranged for providing in composite a first armature field to control the power input to said motor, a first power source connected to said first field winding, a set of power brushes on said armature for producing a second armature field in the direction of said first armature field, a corresponding set of short circuit brushes on said armature for producing a third armature field in quadrature to said second armature field and of a magnitude corresponding to the current flow therebetween and to armature speed, a second power source connected to said set of power brushes, a short circuit connection for said set of short circuit brushes thereby to establish a current flow between said brushes, and means for providing energization to said second field winding in accordance with the third armature field between said short circuit brushes.

2. A direct current motor comprising a field member and an armature member, a first field winding on said field member, a second field winding on said field member, said first and second field windings being arranged for providing in composite a first armature field to control the power input to said motor, a first power source connected to said first field winding for providing constant energization thereto, a set of power brushes on said armature for producing a second armature field in the direction of said first armature field, a corresponding set of short circuit brushes on said armature for producing a third armature field in quadrature to said second armature field and of a magnitude corresponding to the current flow therebetween and to armature speed, a second power source connected to said set of power brushes for providing energization thereto in accordance with the magnitude of the said first armature field thereby establishing the power input to said motor and regulating the power output thereof accordingly, a short circuit connection for said set of short circuit brushes thereby to establish a current flow between said brushes, and means for connecting said second field winding in said short circuit connection to provide energization to said winding in accordance with the current flow between said short circuit brushes thereby to vary the magnitude of the first armature field in order to vary the power output of said motor.

3. A direct current motor comprising a field member and an armature member, a first field winding on said field member, a second field winding on said field member, said first and second field windings being arranged for providing in composite a first armature field to control the power input to said motor, a first power source connected to said first field winding for providing constant energization thereto, a set of power brushes on said armature for producing a second armature field in the direction of said first armature field, a corresponding set of short circuit brushes on said armature for producing a third armature field in quadrature to said second armature field, a second power source connected to said set of power brushes for providing energization thereto in accordance with the magnitude of said first armature field thereby establishing the power input to said motor and regulating the power output thereof accordingly, impedance means connected between the short circuit brushes of said set thereby to establish a current flow path for said brushes, said current flow between said brushes being relatively small at high motor speeds and being relatively large at low motor speeds, and means for connecting said second field winding in parallel with said impedance means thereby to provide energization to said winding in accordance with the current flow between said short circuit brushes thereby to vary the magnitude of the first armature field in order to vary the power output of said motor.

4. A direct current motor comprising a field member and a rotatable armature member, a first field winding on said field member, a second field winding on said field member, said first and second field windings being arranged for providing in composite a first armature field to control the power input to said motor, a first power source connected to said first field winding for providing constant energization thereto, a set of power brushes on said armature for producing a second armature field in the direction of said first armature field, a corresponding set of short circuit brushes on said armature for producing a third armature field in quadrature to said second armature field, a second power source connected to said set of power brushes for providing energization thereto so as to produce a second armature field of a magnitude substantially equal to and opposite the first armature field thereby establishing the power input to said motor and regulating the power output thereof accordingly, first impedance means connected between the short circuit brushes of said set thereby to establish a current flow path for said brushes, said current flow between said brushes being relatively small at high motor speeds and being relatively large at low motor speeds, and second impedance means connected in series with said second field winding across said first impedance means to provide energization to said winding in accordance with the current flow between said short circuit brushes thereby to vary the magnitude of said first armature field in order to vary the power output of said motor.

5. A direct current motor comprising a field member and a rotatable armature member, a first field winding on said field member, a second field winding on said field member, said first and second field windings being arranged for providing in composite a first armature field to control the power input to said motor, a first power source connected to said first field winding for providing constant energization thereto, a set of power brushes on said armature for producing a second armature field in the direction of said first armature field, a corresponding set of short circuit brushes on said armature for producing a third armature field in quadrature to said second armature field, a second power source connected to said set of power brushes for providing energization thereto so as to produce a second armature field of a magnitude substantially equal to and opposite the first armature field thereby establishing the power input to said motor and regulating the power output thereof accordingly, impedance means connected between the short circuit brushes of said set thereby to establish a current flow path for said brushes, said current flow between said brushes being relatively small at high motor speeds and being relatively large at low motor speeds, and resistance means, said resistance means being connected in series with said second field winding across said impedance means for providing energization to said winding in accordance with the current flow between said short circuit brushes and so as to produce a magnetic field in opposing relation to that field produced by said first field winding, whereby the magnitude of said first armature field and accordingly the power output of said motor are decreased appreciably at low motor speeds.

6. A direct current motor comprising a field member and a rotatable armature member, a first field winding on said field member, a second field winding on said field member, said first and second field windings being arranged for providing in composite a first armature field to control the power input to said motor, a first power source connected to said first field winding for providing constant energization thereto, a set of power brushes on said armature for producing a second armature field in the direction of said first armature field, a corresponding set of short circuit brushes on said armature for producing a third armature field in quadrature to said second armature field, a second power source connected to said set of power brushes for providing energization thereto so as to produce a second armature field of a magnitude substantially equal to and opposite the first armature field thereby establishing the power input to said motor and regulating the power output thereof accordingly, impedance means connected between the short circuit brushes of said set thereby to establish a current flow path for said brushes, said current flow between said brushes being relatively small at high motor speeds and being relatively large at low motor speeds, and resistance means, said resistance means being connected in series with said second field winding across said impedance means for providing energization to said winding in accordance with the current flow between said short circuit brushes and so as to produce a magnetic field in aiding relation to that field produced by said first field winding, whereby the magnitude of said first armature field and accordingly the power output of said motor are increased appreciably at low motor speeds.

7. A direct current motor comprising a field member and a rotatable armature member, a first field winding on said field member, a second field winding on said field member, said first and second field windings being arranged for providing in composite a first armature field to control the power input to said motor, a first power source connected to said first field winding for providing constant energization thereto, a set of power brushes on said armature for producing a second armature field in the direction of said first armature field, a corresponding set of short circuit brushes on said armature for producing a third armature field in quadrature to said second armature field, a second power source connected to said set of power brushes for providing energization thereto so as to produce a second armature field of a magnitude substantially equal to and opposite the first armature field thereby establishing the power input to said motor and regulating the power output thereof accordingly, a third field winding on said field member connected in series with the short circuit brushes of said set thereby to establish a current flow path for said brushes wherein the current flow is relatively small at high motor speeds and is relatively large at low motor speeds, said third field winding being arranged on said field member so as to produce a fourth armature field in aiding relation to said third armature field, and variable resistance means, said variable resistance means being connected in series with said second field winding across said third field winding for providing energization to said second winding in accordance with the current flow between said short circuit brushes and so as to produce a magnetic field in opposing relation to that field produced by said first field winding, whereby the magnitude of said first armature field and accordingly the power output of said motor are decreased appreciably at low motor speeds so that the torque of said motor falls off at low motor speeds.

8. A direct current motor comprising a field member and a rotatable armature member, a first field winding on said field member, a second field winding on said field member, said first and second field windings being arranged for providing in composite a first armature field to control the power input to said motor, a first power source connected to said first field winding for providing constant energization thereto, a set of power brushes on said armature for producing a second armature field in the direction of said first armature field and of a magnitude corresponding to the current flow therebetween, a corresponding set of short circuit brushes on said armature for producing a third armature field in quadrature to said second armature field, a second power source connected to said set of power brushes for providing energization thereto so as to produce a second armature field of a magnitude substantially equal to and opposite the first armature field thereby establishing the power input to said motor and regulating the power output thereof accordingly, and first impedance means connected in a circuit with said second field winding between the short circuit brushes of said set thereby to establish a current flow path for said brushes wherein the current flow is relatively small at high motor speeds and relatively large at low motor speeds whereby said second field winding is provided with energization in accordance with current flow between said short circuit brushes thereby to vary the magnitude of said first armature field in order to vary the power output of said motor.

9. A direct current motor comprising a field member and a rotatable armature member, a first field winding on said field member, a second field winding on said field member, said first and second field windings being arranged for providing in composite a first armature field to control the power input to said motor, a first power source connected to said first field winding for providing constant energization thereto, a set of power brushes on said armature for producing a second armature field in the direction of said first armature field, a corresponding set of short circuit brushes on said armature for producing a third armature field in quadrature to said second armature field and of a magnitude corresponding to armature speed, a second power source connected to said set of power brushes for providing energization thereto so as to produce a second armature field of a magnitude substantially equal to and opposite the first aramture field thereby establishing the power input to said motor and regulating the power output thereof accordingly, and a third field winding on said field member connected in a circuit with said field winding between the short circuit brushes of said set thereby to establish a current flow path for said brushes wherein the third field member produces a fourth armature field in aiding relation to said third armature field, whereby said second field winding is provided with energization in accordance with current flow between said short circuit brushes thereby to vary the magnitude of said first armature field in order to vary the power output of said motor.

10. A direct current motor comprising a field member and a rotatable armature member, a first field winding on said field member, a second field winding on said field member, said first and second field windings being arranged for providing in composite a first armature field to control the power input to said motor, a first power source connected to said first field winding for providing constant energization thereto, a set of power brushes on said armature for producing a second armature field in the direction of said first armature field, a corresponding set of short circuit brushes on said armature for producing a third armature field in quadrature to said second armature field, a second power source connected to said set of power brushes for providing energization thereto so as to produce said second armature field of a magnitude substantially equal to and opposite the first armature field thereby establishing the power input to said motor and regulating the power output thereof accordingly, a third field winding on said field member connected in series with the short circuit brushes of said set and said second field winding thereby to establish a current flow path wherein the current flow is relatively small at high motor speeds and is relatively large at low motor speeds, said third field winding being arranged in said connection so as to produce a fourth armature field in aiding relation to said third armature field, said second field winding being arranged in said connection so as to produce a magnetic field in opposing relation to that field produced by said first field winding, and variable resistance means connected in parallel with said third field winding providing a variable impedance shunt path therefor in order thereby to control the magnitude of said fourth armature field, whereby the power output of said motor is decreased at low motor speeds so that the torque of said motor falls off at low motor speeds.

11. A direct current motor comprising a field member and a rotatable armature member, a first field winding on said field member, a second field winding on said field member, said first and second field windings being arranged for providing in composite a first armature field to control the power input to said motor, a first power source connected to said first field winding for providing constant energization thereto, a set of power brushes on said armature for producing a second armature field in the direction of said first armature field, a corresponding set of short circuit brushes on said armature for producing a third armature field in quadrature to said second armature field, a second power source connected to said set of power brushes for providing energization thereto so as to produce said second armature field of a magnitude substantially equal to and opposite the first armature field thereby establishing the power input to said motor and regulating the power output thereof accordingly, a third field winding on said field member connected in series with the short circuit brushes of said set and said second field winding thereby to establish a current flow path wherein the current flow is relatively small at high motor speeds and is relatively large at low motor speeds, said third field winding being arranged in said connection so as to produce a fourth armature field in aiding relation to said third armature field, said second field winding being arranged in said connection so as to produce a magnetic field in opposing relation to that field produced by said first field winding, and variable resistance means connected in parallel with said second field winding providing a variable impedance shunt path therefor in order thereby to control the magnitude of the magnetic field produced thereby, whereby the magnitude of said first armature field and accordingly the power output of said motor are decreased at low motor speeds so that the torque of said motor falls off at low motor speeds.

12. A direct current motor comprising a field member and a rotatable armature member, a first field winding on said field member, a second field winding on said field member, said first and second field windings being arranged for providing in composite a first armature field to control the power input to said motor, a first power source connected to said first field winding for providing constant energization thereto, a set of power brushes on said armature for producing a second armature field in the direction of said first armature field, a corresponding set of short circuit brushes on said armature for producing a third armature field in quadrature to said second armature field, a second power source connected to said set of power brushes for providing energization thereto so as to produce said second armature field of a magnitude substantially equal to and opposite the first armature field thereby establishing the power input to said motor and regulating the power output thereof accordingly, a third field winding on said field member connected in series with the short circuit brushes of said set and said second field winding thereby to establish a current flow path wherein the current flow is relatively small at high motor speeds and is relatively large at low motor speeds, said third field winding being arranged in said connection so as to produce a fourth armature field in aiding relation to said third armature field, said second field winding being arranged in said connection so as to produce a magnetic field in opposing relation to that field produced by said first field winding, first variable resistance means connected in parallel with said third field winding providing a variable impedance shunt path therefor in order thereby to control the magnitude of said fourth armature field, and second variable resistance means connected in parallel with said second field winding providing a variable impedance shunt path therefor in order thereby to control the magnitude of the magnetic field produced thereby, whereby the magnitude of said first armature field and accordingly the power output of said motor are decreased at low motor speeds so that the torque of said motor falls off at low motor speeds.

13. A direct current motor comprising a field member and a rotatable armature member, a first field winding on said field member, a second field winding on said field member, said first and second field windings being arranged for providing in composite a first armature field to control the power input to said motor, a first power source connected to said first field winding for providing constant energization thereto, a set of power brushes on said armature for producing a second armature field in the direction of said first armature field, a corresponding set of short circuit brushes on said armature for producing a third armature field in quadrature to said second armature field, a start winding for producing an armature field parallel to the direction of said third armature field, a second power source connected to said set of power brushes through said start winding providing energization thereto so as to produce said second armature field of a magnitude substantially equal to and opposite the first armature field thereby establishing the power input to said motor and regulating the power output and so as to produce at said start winding an armature field for causing a starting motor torque, a third field winding on said field member connected in series with the short circuit brushes of said set and said second field winding thereby to establish a current flow path wherein the current flow is relatively small at high motor speeds and is relatively large at low motor speeds, said third field winding being arranged in said connection so as to produce a fourth armature field in aiding relation to said third armature field, said second field winding being arranged in said connection so as to produce a magnetic field in opposing relation to that field produced by said first field winding, first variable resistance means connected in parallel with said third field winding providing a variable impedance shunt path therefor in order thereby to control the magnitude of said fourth armature field, and second variable resistance means connected in parallel with said second field winding providing a variable impedance shunt path therefor in order thereby to control the magnitude of the magnetic field produced thereby, whereby the magnitude of said first armature field and accordingly the power output of said motor are decreased at low motor speeds so that the torque of said motor falls off at low motor speeds.

References Cited in the file of this patent
UNITED STATES PATENTS 2,038,380  Pestarini _____ Apr. 21, 1936